L. W. BODINSON.
DEEP WELL PUMP.
APPLICATION FILED SEPT. 6, 1912.
1,152,479.
Patented Sept. 7, 1915.
6 SHEETS—SHEET 1.
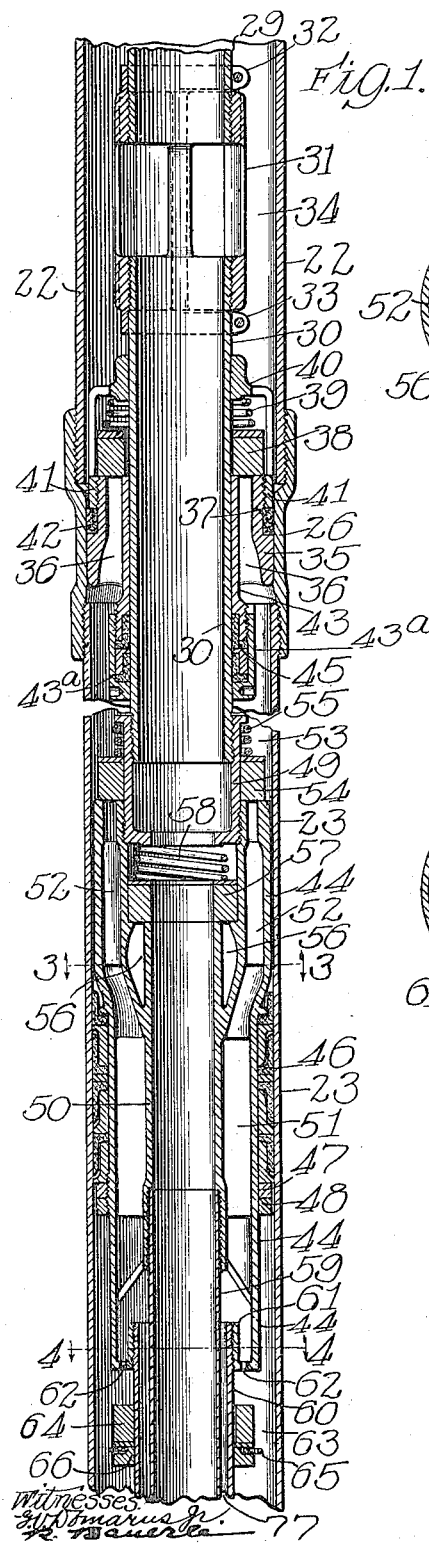
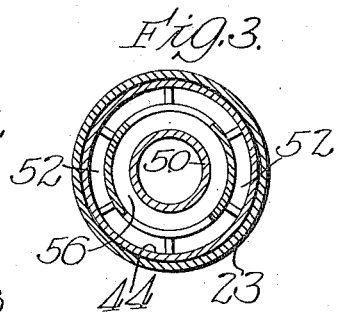
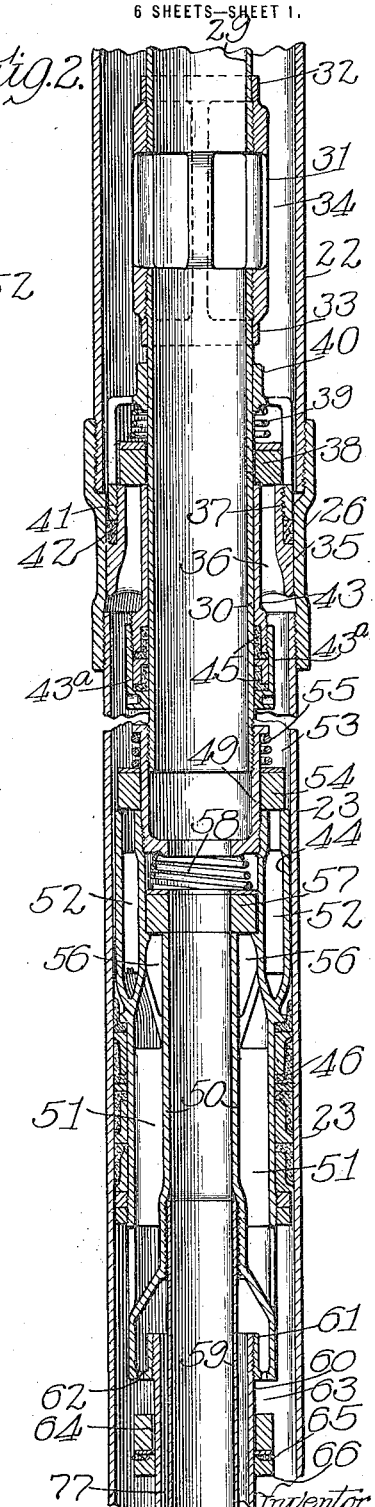

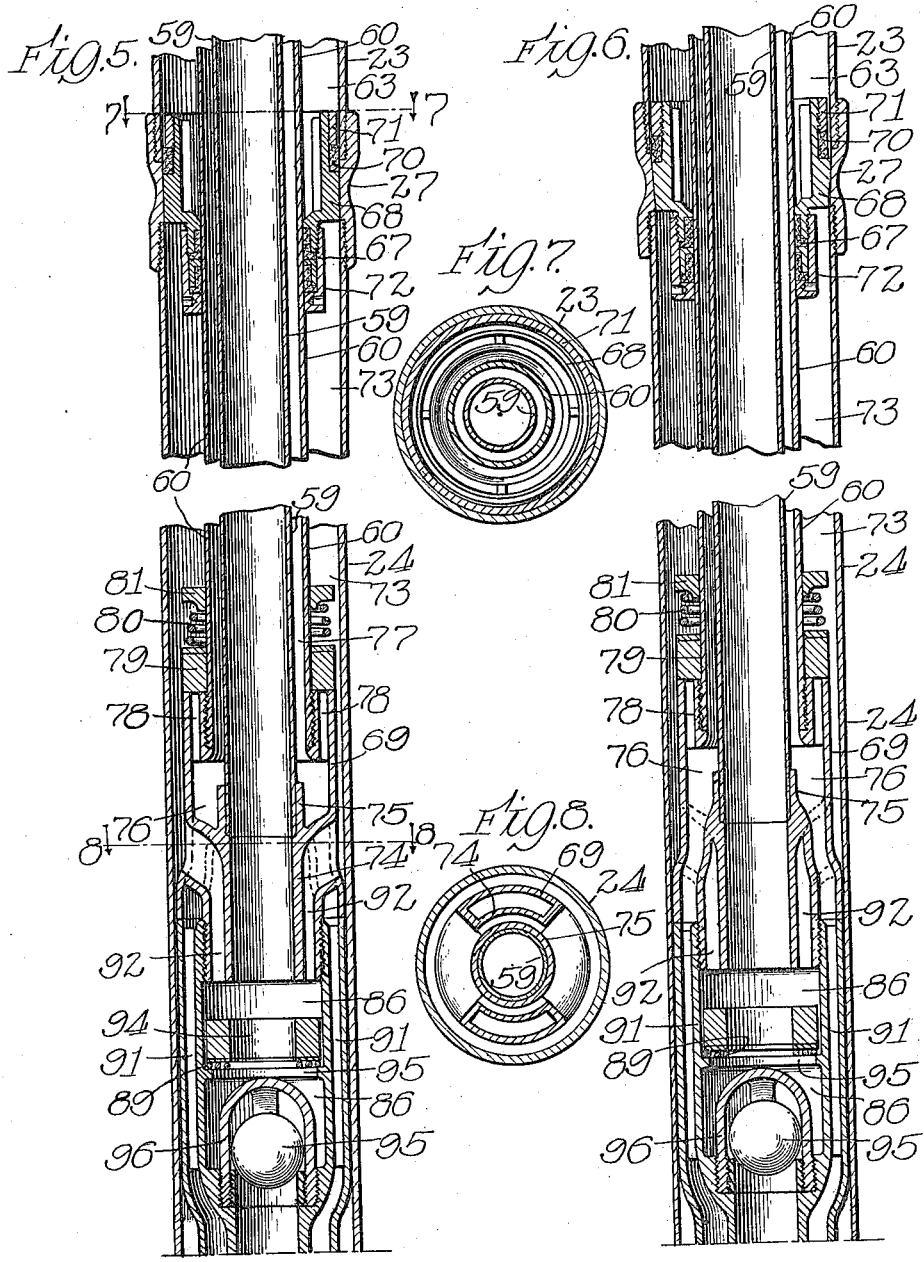

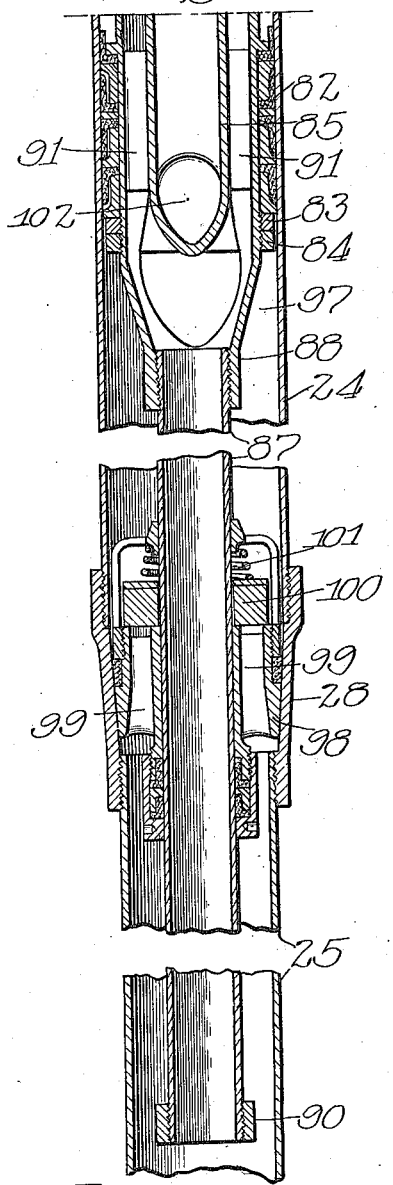
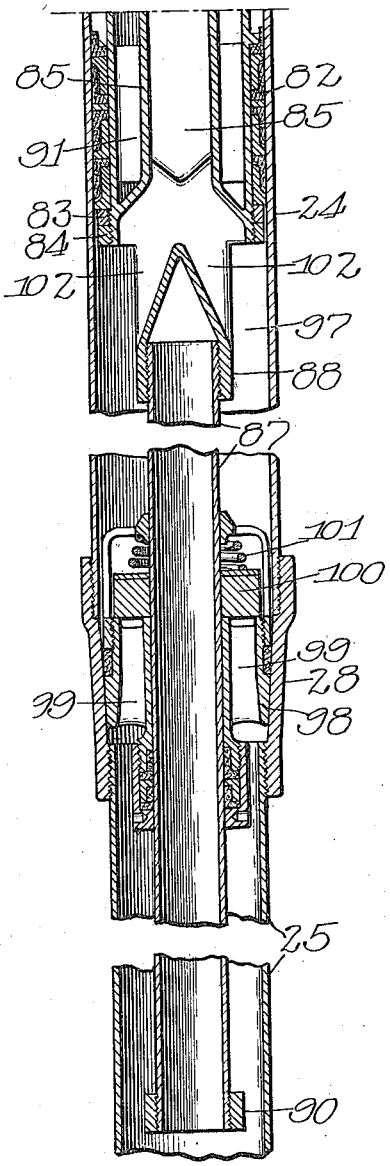

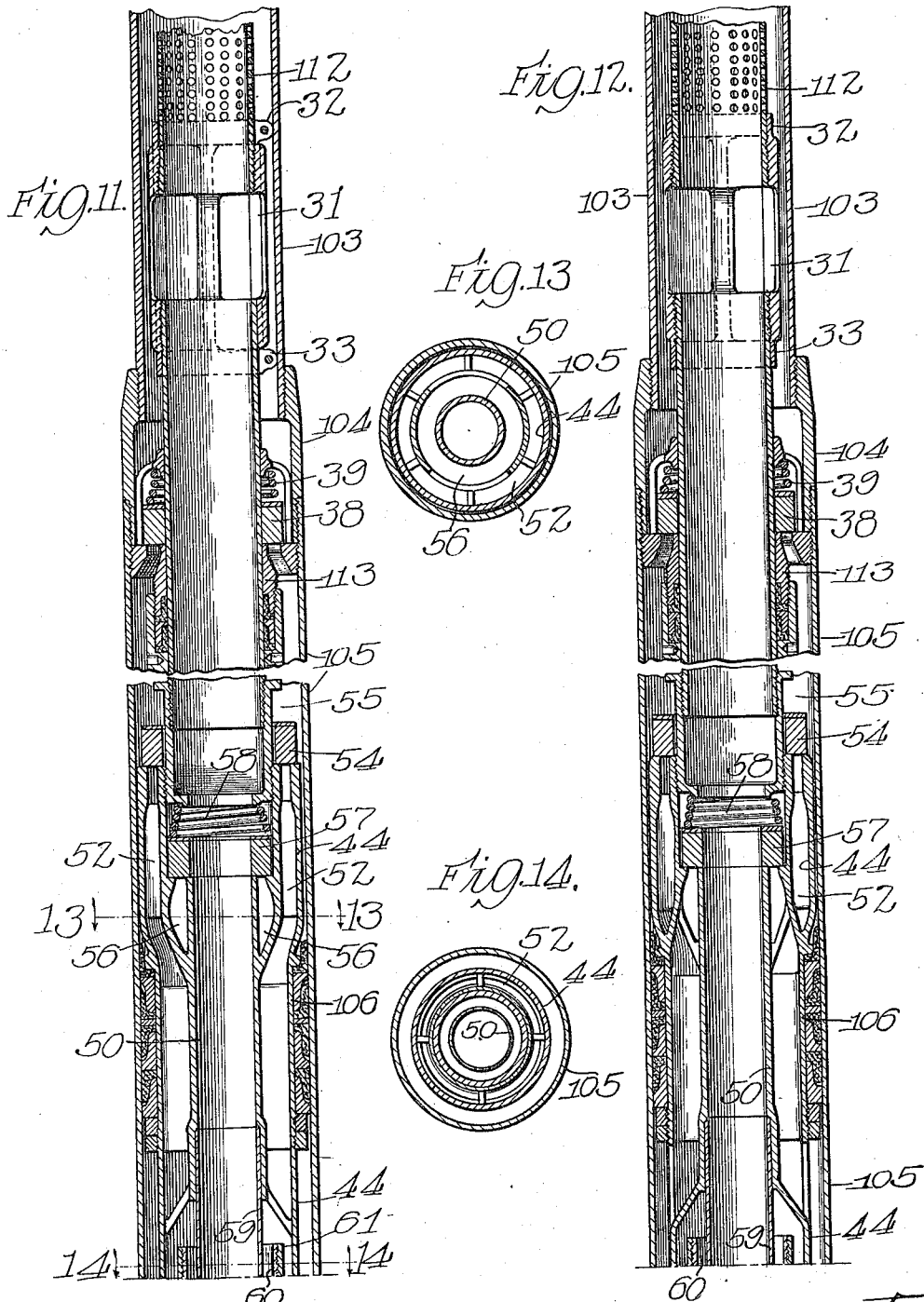

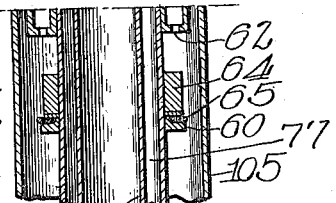
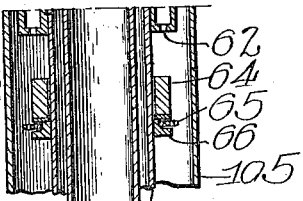
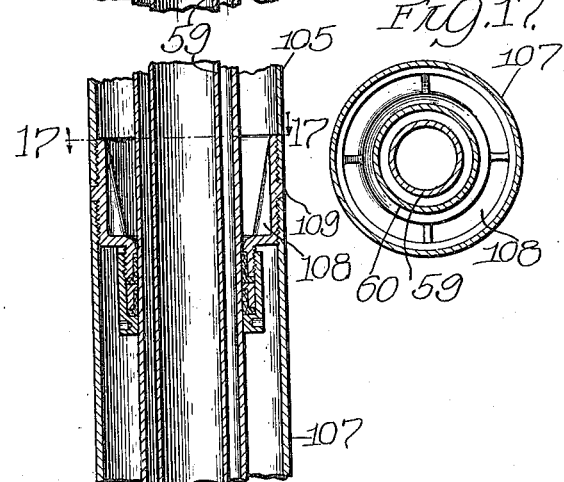
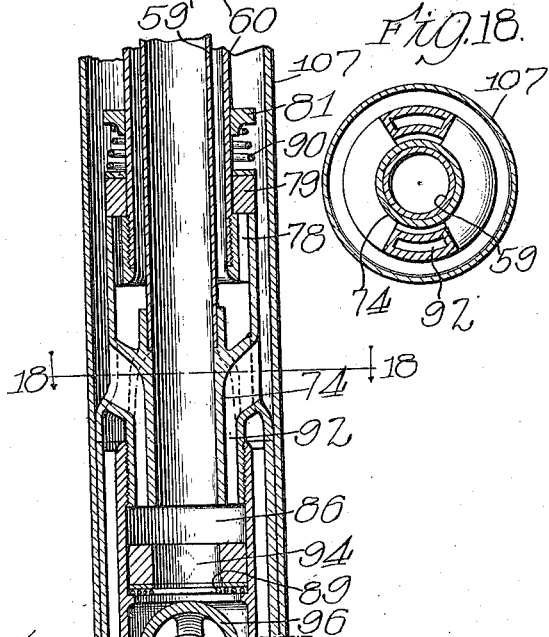
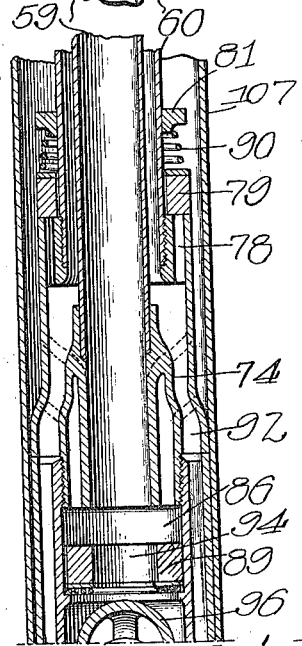

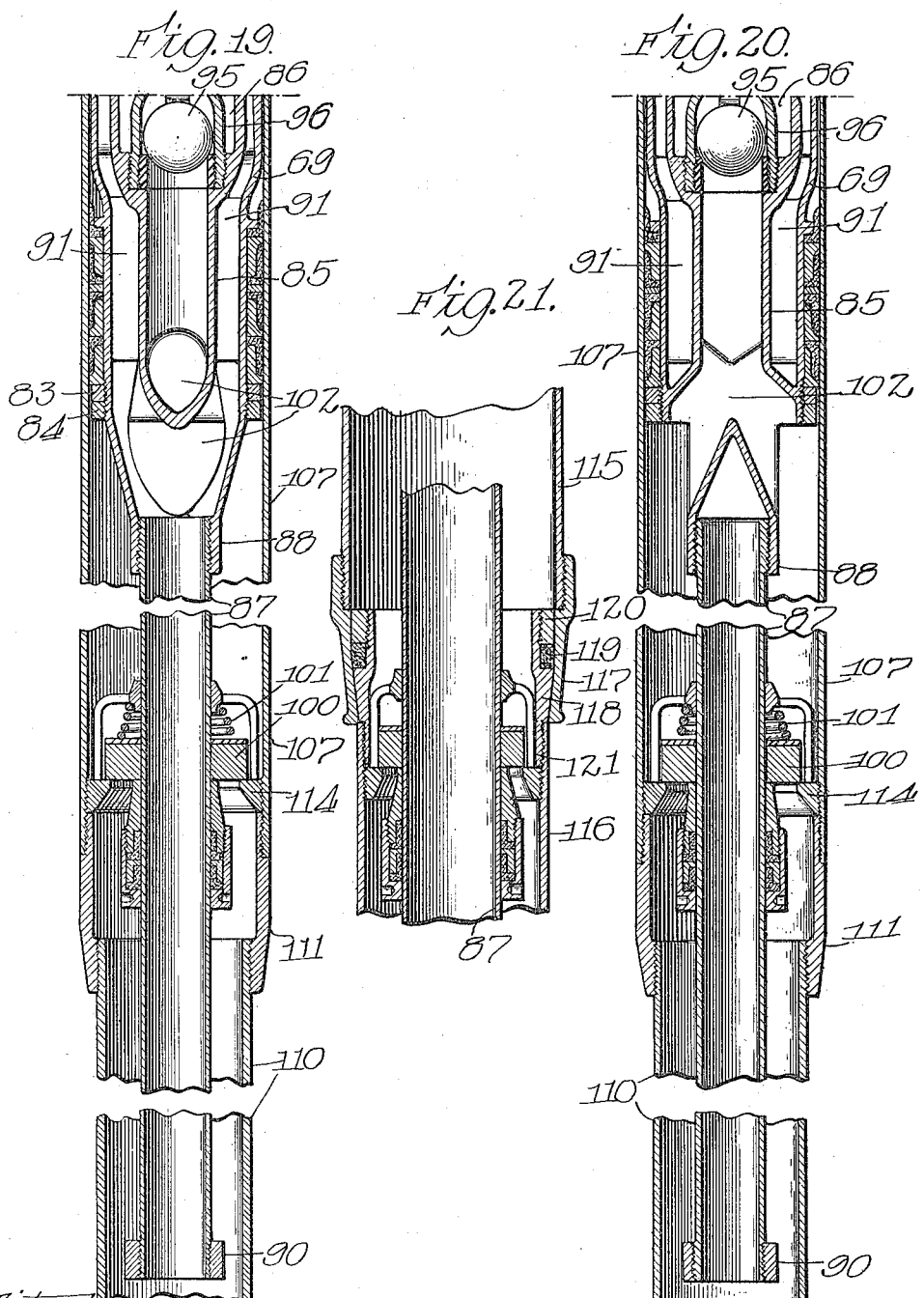

UNITED STATES PATENT OFFICE.

LARS W. BODINSON, OF AURORA, ILLINOIS, ASSIGNOR TO THE AMERICAN WELL WORKS, OF AURORA, ILLINOIS, A CORPORATION OF ILLINOIS.

DEEP-WELL PUMP.

1,152,479. Specification of Letters Patent. Patented Sept. 7, 1915.

Application filed September 6, 1912. Serial No. 718,843.

*To all whom it may concern:*

Be it known that I, LARS W. BODINSON, a citizen of the United States, residing at Aurora, in the county of Kane, State of Illinois, have invented certain new and useful Improvements in Deep-Well Pumps, of which the following is a specification, reference being had to the accompanying drawings.

My invention relates to pumps for raising water from deep wells and has more particularly to do with pumps of the general type shown and described in patent to R. E. L. Holmes, No. 990,359, dated April 25, 1911, and in an application of Matthew T. Chapman, Serial No. 426,556, filed April 11, 1908.

It has for its object to provide certain improvements by which the capacity of the pump is greatly increased and by which the several parts of the pump may properly be supported in the well and may readily be removed, when desired. I accomplish this object as illustrated in the drawings and as hereinafter described.

What I regard as new is set forth in the claims.

In the accompanying drawings,—Figure 1 is a vertical section illustrating the upper portion of the well-tube and pumping mechanism. Fig. 2 is a similar view, taken at right angles to the view shown in Fig. 1. Fig. 3 is a horizontal section on line 3—3 of Fig. 1. Fig. 4 is a horizontal section on line 4—4 of Fig. 1. Figs. 5 and 6 are vertical sections of the intermediate portion of the well-tube and pumping mechanism, being extensions downward of the views shown in Figs. 1 and 2 respectively. Fig. 7 is a horizontal section on line 7—7 of Fig. 5. Fig. 8 is a horizontal section on line 8—8 of Fig. 5. Figs. 9 and 10 are extensions downward of the views shown in Figs. 5 and 6 respectively. Fig. 11 is a vertical section of the upper portion of the well-tube and pumping mechanism, showing a modified arrangement. Fig. 12 is a sectional view of the construction shown in Fig. 11, taken at right angles to that view. Fig. 13 is a horizontal section on line 13—13 of Fig. 11. Fig. 14 is a horizontal section on line 14—14 of Fig. 11. Figs. 15 and 16 are extensions downward of the views shown in Figs. 11 and 12 respectively. Fig. 17 is a horizontal section on line 17—17 of Fig. 15. Fig. 18 is a horizontal section on line 18—18 of Fig. 15. Figs. 19 and 20 are sectional views, being downward extensions respectively of the views shown in Figs. 15 and 16; and Fig. 21 is a view showing a modified arrangement of the upper portion of the well-tube and pumping mechanism.

Referring to the drawings, and more particularly to Figs. 1 to 10, inclusive:—22—23—24 and 25 indicate several sections of a well-tube which extends below the normal surface of the water in the well. Sections 22—23 are connected by a coupling 26, the end portions of which are screw-threaded, its intermediate portion being tapered so as to flare upwardly, as shown in Fig. 1. It will be noted that the upper section 22 of the well-tube is of somewhat greater diameter than the section 23, and in like manner the sections 24—25 are progressively of less diameter.

27 indicates a similar coupling which connects the sections 23 and 24 of the well-tube, and 28 indicates a similar coupling which connects the sections 24 and 25.

29—30 indicate the upper sections of a tubular pump-rod, the uppermost section 29 extending to the upper end of the well and being connected to and operated by any suitable pumping mechanism by which it may be reciprocated. Sections 29—30 are connected by a cage 31, the end portions of which are screw-threaded and screwed upon the adjoining ends of said sections 29—30. The cage 31 is also provided at its ends with clamps 32—33, which embrace sections 29—30 of the pump-rod respectively and being clamped thereon, serve to prevent said sections from unscrewing. The purpose of the cage 31 is to let water pass out of the pump-rod section 30 into the space 34 which lies between the said pump-rod section and the well-tube 22.

35 indicates a tapered valve block which fits closely in the intermediate portion of the coupling 26, but may be withdrawn in an upward direction. Block 35 is provided with vertical passages 36 extending through it, which passages are normally closed against the downward flow of water by a ring-valve 38, which is seated upon the upper surface of the block 35 over said passage, and is pressed down by a spring 39.

40 indicates a cage which fits upon the pump-rod section 30, over the valve 38, and is provided at its lower end with a collar 41 which screws upon a reduced portion 37 of the block 35. The cage 40, therefore, serves to hold the spring 39 in place and limits the upward movement of the valve 38.

42 indicates packing interposed between the collar 41 and the block 35, which packing is compressed by the collar 41, thereby preventing leakage between the block 35 and the coupling 26. By this construction water may be forced upward through the passages 36 into the chamber 34, but cannot pass in a reverse direction. The block 26 is also provided centrally with a sleeve 43 which fits closely upon the pump-rod section 30, as shown in Fig. 1. Said sleeve carries at its lower end a compressing collar or nut 43ª for compressing packing 45 which is interposed between the said collar and the pump-rod section 30; thus leakage between the pump-rod section 30 and the sleeve 43 is prevented.

44 indicates a piston or plunger which is fitted in the well-tube section 23 and reciprocates therein, said tube section forming the barrel or cylinder of a pump.

46 indicates packing between the piston 44 and the well-tube section 23, said packing being compressed by collars 47—48, screwed upon the lower portion of the piston, which is reduced in diameter, as shown in Fig. 1. The piston 44 is connected by a coupling 49 with the lower end of the pump-rod section 30, said coupling being screwed upon the lower end of said pump-rod section and into the upper-end portion of the piston 44. The piston 44 is provided with a concentric tube 50, which is adapted practically to form a continuation of the pump-rod section 30, with which it communicates by means of the coupling 49, as shown in Fig. 1.

51 indicates a chamber in the piston 44 between the tube 50 and the outer wall of said piston, which chamber communicates by passages 52 with a chamber 53 in the well-tube section 23, above the piston 44.

54 indicates a ring-valve which is seated upon the upper end of the piston 44 and is pressed down on its seat by a spring 55 fitted around the upper portion of the coupling 49, as shown in Fig. 1. By this arrangement water may flow upward through the passages 52 into the chamber 53, but cannot flow in a reverse direction.

56 indicates passages which communicate with the chamber 51 and with the interior of the pump-rod section 30, as shown in Figs. 1 and 2. The upper ends of the passages 56 are normally closed by a ring-valve 57 which is seated thereover and is pressed down by a spring 58.

59 indicates an inner tubular pump-rod which forms a continuation downward of the tube 50, to the lower end of which it is screwed, as shown in Figs. 1 and 2.

60 indicates an outer tubular pump-rod which is of somewhat greater diameter than the section 59, around which it is disposed, the upper end of said pump-rod 60 being screwed to the lower end of the piston 44, said piston being provided with an upturned flange 61 for that purpose.

62 indicates ports at the lower end of the piston 44, which afford communication between the chamber 51 and a chamber 63 which surrounds the outer pump-rod 60.

64 indicates a ring-valve which is fitted upon the pump-rod 60 below the lower end of the piston 44, said valve being adapted to fit against the lower end of said piston to close the ports 62. It is normally held in its uppermost position so as to close said ports by means of a spring 65 which rests upon and is supported by a collar 66, secured to the pump-rod 60. The arrangement is such that downward flow of water through the ports 62 is permitted, but upward flow of water therethrough is prevented.

As best shown in Figs. 5 and 6, the outer pump-rod 60 extends down through the coupling 27 and suitable packing 67, carried by a wedge block 68 in said coupling, to a second piston 69, fitted in the well-tube section 24, said pump-rod being connected to said piston by screwing to the upper end portion thereof, as shown in Fig. 5. The wedge block 68 fits closely in the coupling 27 and is packed to prevent leakage by packing 70 and a compressing collar 71 which screws upon the block 68 in such manner as to compress said packing. The packing 67 fits closely around the outer pump-rod section 60 and is compressed by a collar 72 so as to prevent leakage around said pump-rod. This arrangement serves to separate the chamber 63 from the chamber 73 which is formed between the pump-rod 60 and the well-tube section 24 and lies above the piston 69. The piston 69 is provided with a concentric tube 74 which is in alinement with the inner pump-rod 59 and is directly connected therewith, as shown in 75 in Fig. 5, the parts being screwed together. 76 indicates a chamber in the upper portion of the piston 69 which communicates with the chamber 51 of the piston 44 through an annular passage 77 which occurs between the inner and outer pump-rod sections 59—60, as shown in Figs. 5 and 1. The chamber 76 also communicates with the chamber 73 by passages 78 which are normally closed against the downward flow of water by ring-valve 79, normally held upon its seat by a spring 80. This spring is held in position by a collar 81 mounted upon the outer pump-rod section 60, as shown in Fig. 5.

82 indicates packings around the piston 69 between said piston and the section 24 of the well-tube, said packings being compressed by collars 83—84, as shown in Fig. 9.

85 indicates a central tube or passage in the piston 69, below the tube 74, as shown in Figs. 5 and 9.

86 indicates a chamber in the piston 69 between the upper end of the tube 85 and the lower end of the tube 74.

87 indicates a suction tube which connects with the lower end of the piston 69, being screwed into the lower end thereof, which is reduced in diameter, as shown in 88 in Fig. 9, said suction tube extending down into the well to a sufficient depth so that air cannot pass into it under the action of the pump. The suction tube 87 carries a collar 90 at its lower end, as shown in Fig. 9.

91 indicates passages extending down from the chamber 76 to and communicating with the upper end of the suction tube 87.

92 indicates passages affording communication between the chamber 73 and the chamber 86.

94 indicates a ring-valve in the chamber 86, which is adapted to overlie the lower ends of the passages 92 to close the same against upward flow of water, said valve being normally held to its seat by a spring 89 resting on an inwardly projecting flange 95 in said chamber.

95 indicates a ball valve which fits in the upper end of the tube 85 and closes the same against downward flow of water.

96 indicates a cage which incloses the valve 95 and prevents it from being displaced.

97 indicates a chamber which surrounds the suction tube 87, said chamber being closed at its lower end against downward flow of water by a tapered valve block 98 which fits in the coupling 28 and is substantially of the same construction as the valve block 35. Said valve block is provided with vertical passages 99 which are normally closed against downward flow of water by a ring-valve 100 held down to its seat by a spring 101. The chamber 97 communicates with the interior of the tube 85 by ports 102, as shown in Fig. 10.

The operation of the apparatus thus far described is as follows: On the down-stroke of the pistons, water will pass up through suction tube 87, and passages 91, to chamber 76, whence part of it will pass into chamber 73 through passages 78, the valve 79 being lifted off its seat by the action of the water. The rest of the water will pass up through the passage 77, and through the chamber 51 in the piston 44; thence up through passages 52 into chamber 53, the valve 54 being lifted by the action of the water. At the same time the water in chamber 97, which will have entered said chamber on the previous up-stroke of the pistons, will pass up through ports 102 and tube 85 into chamber 86, valve 95 being lifted by the action of the water, and then will rise through tubes 74—59 and 30 to the outlet, a part of the water passing out through the cage 31 into the chamber 34. At the same time the water in the chamber 63, which will have been filled on the previous up-stroke of the piston 44, will pass up through passages 51 and 56 into the tube 30, the valves 57 being lifted by the action of the water. It will thus be seen that in addition to elevating water to the chamber 34 and to the uppermost pump-rod section 29, the chambers 53 and 73 will have been filled with water. On the up-stroke of the pistons water will be sucked up into chambers 97 in the lower part of the well rising through passages 99, the valve 100 being raised from its seat by action of the water. At the same time, water in the chamber 73 will be forced downward through passages 92 into chamber 86, valve 94 being pressed down off its seat by the down flowing water. The water will then flow up through tube 74 as it cannot pass down below the chamber 86 because of the valve 95. It will therefore rise through tube 59 and the connecting tubes to the outlet. At the same time water will be drawn up into the chamber 51 in plunger 44 by said plunger and will pass down through the ports 62 into the chamber 63, filling said chamber, and the water in chamber 53 above the plunger 44 will be raised through passages 36 to chamber 34.

It will be seen from the foregoing description that each of the two plungers operates to lift a separate body of water both on the up-stroke and on the down-stroke so that the pump is a double double-acting pump, its capacity being 1.6 times that of a double-acting pump. Furthermore, owing to the construction described, all operating parts of the pump may readily be removed when desired. For example, when the plunger-rod is lifted above the length of its stroke, collar 90 will engage the lower projecting portion of the valve block 98 and will lift it off its seat. At the same time collar 81 will engage the lower end of the block 68 and will lift it out of its seat in the coupling 27, and coupling sleeve 49 will engage the lower end of the valve 35 and lift it off its seat. Thus the pump-rods, with the pistons and the several valves and blocks may all be withdrawn from the well.

In Figs. 11 to 20 inclusive I have shown a pump operating in the same way as that already described so far as the elevation of water is concerned, but the construction is such that the several valves cannot be removed without unscrewing the several sections going to make up the well-tube.

Referring to the latter figures,—103 indicates the uppermost section of the well-tube which screws into the upper end of a coupling 104, the latter being screwed to the upper end of a larger well-tube section 105, which is larger in diameter than section 103.

The section 105 forms the barrel or cylinder in which the upper piston 106 operates, the latter being similar in construction to the piston 44. 107 indicates a lower well-tube section which is connected to the section 106 by a block 108 which corresponds in function with the block 68. The block 108 is screw-threaded to receive the adjacent ends of the well-tube sections 105—107 and is provided with a peripheral rib 109 which fits between the adjoining ends of said well-tube sections, as shown in Fig. 15, thus forming a tight joint. 110 indicates the lowermost well-tube section which is coupled to the section 107 by a coupling 111, as shown in Fig. 19. 112 indicates the uppermost section of the pump-rod which is similar to the section 29, shown in Fig. 1, except that it is perforated to permit water to pass more freely into the well-tube. The remaining sections of the pump-rod are the same as those shown in Figs. 1 to 10. 113 indicates a valve block in the upper portion of the well-tube section 105, which corresponds with the valve block 35, as shown in Fig. 1, but is supported somewhat differently, valve block 113 being screwed into the upper end of the well-tube section 105, as shown in Fig. 11, instead of having a wedging fit in the coupling 26. 114 indicates a valve block which corresponds with valve block 98, shown in Fig. 9, but is secured in the lower end portion of the well-tube section 108 by being screwed thereinto, as shown in Fig. 19. The other parts of the modified construction shown in Figs. 11 to 20 need no further description.

In Fig. 21 I have illustrated a further modification in which all the lower sections of the well-tube, as well as the several valves, are supported from the uppermost section of the well-tube, and by which they may all be readily withdrawn, when desired. In the latter construction, 115 indicates the uppermost section of the well-tube and 116 the next lower section thereof. 117 indicates a tapered coupling which screws upon the uppermost section 115, as shown in Fig. 21. 118 indicates an annular wedge block which is seated in the coupling 117 and is preferably provided with packing 119 and a compressing ring 120, to prevent leakage between said block and the coupling 117. As shown in the drawing, the block 118 is provided with a downward projecting portion 121 which is screw-threaded and receives the upper end of the well-tube section 116. Thus the said well-tube section, together with the sections below it, and the parts carried thereby, are all supported from the block 118, and may all, together with said block, be withdrawn from the well in the manner described in connection with the construction shown in Figs. 1 to 10.

My improved pump is especially valuable in pumping water or oil from bored wells of small diameter, where difficulty has heretofore been experienced in pumping as much water with an ordinary pump of either the single or the double-acting type, as the well would supply, my invention providing a double double-acting pump which gives double the quantity of water of a double-acting pump, or four times the quantity of a single-acting pump, less the space occupied by the working parts in the cylinder.

That which I claim as my invention, and desire to secure by Letters Patent, is,—

1. A pump comprising an imperforate well-tube, a tubular pump-rod adapted to reciprocate therein, means dividing said well-tube into upper and lower chambers, plungers in said upper and lower chambers operated by said pump-rod, means outside of said pump-rod for conducting water from below the lower plunger to the upper chamber above the plunger therein, and upwardly-opening valves secured in said well-tube below said lower plunger and above said upper plunger, respectively.

2. A pump comprising an imperforate well-tube, a tubular pump-rod adapted to reciprocate therein, means dividing said well-tube into upper and lower chambers, plungers in said upper and lower chambers, and a passage outside the pump-rod for conducting water from below the lower plunger to the upper chamber below the upper plunger.

3. A pump comprising an imperforate well-tube, a tubular pump-rod adapted to reciprocate therein, means dividing said well-tube into upper and lower chambers, plungers in said upper and lower chambers, a passage outside the pump-rod for conducting water from below the lower plunger to the upper chamber below the upper plunger and to the upper chamber above the plunger therein, and an upwardly-opening valve between the upper portion of said upper chamber and said passage.

4. A pump comprising an imperforate well-tube, a tubular pump-rod adapted to reciprocate therein, means dividing said well-tube into upper and lower chambers, plungers in said upper and lower chambers, a passage outside the pump-rod for conducting water from below the lower plunger to the upper chamber below the upper plunger, a downwardly-opening valve between said passage and the lower portion of said upper chamber, a passage through the upper plunger leading from the lower portion of the upper chamber to the pump-rod, and an upwardly-opening valve for preventing downward flow through the latter passage.

5. A pump comprising a well-tube, a partition dividing said well-tube intermediately into upper and lower chambers, a tubular pump-rod extending through said partition and adapted to reciprocate in the well-tube, plungers in said upper and lower chambers, said plungers being connected with the pump-rod, an upwardly-opening check-valve in the well-tube below the lower plunger, a suction tube connected with the lower end of the pump-rod and extending through said check-valve, and a passage connecting said suction tube with the upper chamber.

6. A pump comprising a well-tube, a tubular pump-rod adapted to reciprocate therein, means dividing said well-tube into upper and lower chambers, plungers in said chambers, connected with said pump-rod, an upwardly opening valve in the well-tube above the upper plunger, one or more passages in the upper plunger connecting the upper and lower portions of said upper chamber, an upwardly opening valve at the upper ends of said passages, a downwardly opening valve at the lower ends of said passages, and means acting on the up-stroke of said pump-rod to fill the space in the upper chamber below the plunger therein and to discharge water in an upward direction through said passages, one or more passages in the upper plunger for discharging water from such space into the pump-rod on the down-stroke thereof, and a valve closing the latter passages on the up-stroke of the pump-rod.

7. A pump comprising a well-tube, a partition dividing said well-tube into upper and lower chambers, a tubular pump-rod adapted to reciprocate in said well-tube, plungers connected with said well-tube and adapted to reciprocate in said chambers respectively, a check-valve in the well-tube below the lower plunger, said pump-rod communicating with the space between the lower plunger and said check-valve, and a suction tube extending through said check-valve and communicating with the upper chamber below the plunger therein.

8. A pump comprising a well-tube, a tubular pump-rod adapted to reciprocate therein, means dividing said well-tube into upper and lower chambers, plungers in said chambers, connected with said pump-rod, a chamber in said lower plunger, communicating with the pump-rod, a downwardly opening valve in said chamber, passages in said lower plunger connecting the latter chamber with the upper portion of the lower well-tube chamber in said passages being closed on the downward stroke of the pump-rod by said valve, an upwardly opening valve in said lower plunger below the chamber therein, a suction tube extending downward from the lower plunger, passages leading from said suction tube through said lower plunger to the lower well-tube chamber above said plunger, and an upwardly opening valve for closing the latter passages against downward flow of water.

9. A pump comprising a well-tube, a tubular pump-rod adapted to reciprocate therein, means dividing said well-tube into upper and lower chambers, plungers in said chambers, connected with the pump-rod, a chamber in said lower plunger, communicating with the pump-rod, a downwardly opening valve in said chamber, passages in said lower plunger connecting the latter chamber with the upper portion of the lower well-tube chamber, said passage being closed on the downward stroke of the pump-rod by said valve, an upwardly opening valve in said lower plunger below the chamber therein, a suction tube extending downward from the lower plunger, passages leading from said suction tube through said lower plunger to the lower well-tube chamber above said plunger, an upwardly opening valve for closing the latter passages against downward flow of water, a tube connecting the latter passages with the lower portion of the upper well-tube chamber, and a downwardly opening valve for controlling the flow of water through said tube.

10. A pump comprising a well-tube, a pump-rod adapted to reciprocate therein, means dividing said well-tube into upper and lower chambers, plungers in said chambers and connected with the pump-rod, a chamber in the lower plunger communicating with the pump-rod, passages in the lower plunger connecting the chamber therein with the lower well-tube chamber above the lower plunger, a downwardly opening valve in said plunger chamber for closing said passages on the down-stroke of the pump-rod, an upwardly opening valve in said lower plunger below the chamber therein, a passage closed by the latter valve on the up-stroke of the pump-rod, said passage communicating with the well-tube below the lower plunger, an upwardly opening valve in the lower portion of the well-tube below the lower plunger, a suction tube connected with the lower plunger and extending down into the well-tube by the said lower valve, one or more passages extending from said suction tube to and communicating with the upper portion of the lower well-tube chamber, an upwardly opening valve for closing said passages on the up-stroke of the pump-rod, one or more passages in the upper plunger communicating with the upper well-tube chamber above the plunger therein, an upwardly opening valve for closing said passages on the up-stroke of the pump-rod, and a tube connecting the latter passages with the passages in the lower plunger leading from the suction tube.

11. A pump comprising a well-tube, a pump-rod adapted to reciprocate therein, means dividing said well-tube into upper and lower chambers, plungers in said chambers and connected with the pump-rod, a chamber in the lower plunger communicating with the pump-rod, passages in the lower plunger connecting the chamber therein with the lower well-tube chamber above the lower plunger, a downwardly opening valve in said plunger chamber for closing said passages on the down-stroke of the pump-rod, an upwardly opening valve in said lower plunger below the chamber therein, a passage closed by the latter valve on the up-stroke of the pump-rod, said passage communicating with the well-tube below the lower plunger, an upwardly opening valve in the lower portion of the well-tube below the lower plunger, a suction tube connected with the lower plunger and extending down into the well-tube by the said lower valve, one or more passages extending from said suction tube to and communicating with the upper portion of the lower well-tube chamber, an upwardly opening valve for closing said passages on the up-stroke of the pump-rod, one or more passages in the upper plunger communicating with the upper well-tube chamber above the plunger therein, an upwardly opening valve for closing said passages on the up-stroke of the pump-rod, a tube connecting the latter passages with the passages in the lower plunger leading from the suction tube, ports connecting the passages in the upper plunger with the lower portion of the upper well-tube chamber, a downwardly opening valve for closing said ports on the down-stroke of the pump-rod, one or more passages connecting the lower potion of the upper well-tube chamber with the pump-rod, and an upwardly opening valve for closing the latter passages on the up-stroke of the pump-rod.

12. A pump comprising a well-tube, a partition dividing said well-tube into upper and lower chambers, a tubular pump-rod adapted to reciprcoate in said well-tube, plungers connected with said well-tube and adapted to reciprocate in said chambers respectively, a check-valve in the well-tube below the lower plunger, said pump-rod communicating with the space between the lower plunger and said check-valve, a suction tube extending through said check-valve and communicating with the upper chamber above the plunger therein, and an upwardly-opening valve for preventing downward flow of water from the upper portion of the upper chamber.

13. A pump comprising a well-tube, a partition dividing said well-tube into upper and lower chambers, a tubular pump-rod adapted to reciprocate in said well-tube, plungers connected with said well-tube and adapted to reciprocate in said chambers respectively, a check-valve in the well-tube below the lower plunger, said pump-rod communicating with the space between the lower plunger and said check-valve, a suction tube extending through said check-valve and communicating with the upper chamber below the plunger therein and also communicating with the upper chamber above the plunger therein, and an upwardly-opening valve for preventing down flow of water from the upper portion of the upper chamber.

14. A pump comprising upper and lower chambers, a tubular pump-rod adapted to reciprocate in said chambers, plungers in said chambers and operated by said pump-rod, a tube surrounding said pump-rod and leading from the lower to the upper chamber, and means co-acting with said plungers to cause the same to lift a body of water on each upward or downward stroke thereof.

15. A pump comprising a well-tube, a partition dividing said well-tube intermediately into upper and lower chambers, a tubular pump-rod extending down through said partition and adapted to reciprocate in the well-tube, plungers connected with said pump-rod and adapted to reciprocate in said chambers respectively, a check-valve in the well-tube below the lower plunger, a suction tube connected with the pump-rod and extending down through said check-valve, a passage connecting said suction tube with the lower chamber above the plunger therein and with the upper chamber, and an upwardly-opening valve between the upper portion of the lower chamber and said passage.

16. A pump comprising a well-tube, a partition dividing said well-tube intermediately into upper and lower chambers, a tubular pump-rod extending down through said partition and adapted to reciprocate in the well-tube, plungers connected with said pump-rod and adapted to reciprocate in said chambers respectively, a check-valve in the well-tube below the lower plunger, a suction tube connected with the pump-rod and extending down through said check-valve, a passage connecting said suction tube with the lower chamber above the plunger therein and with the upper chamber below the plunger therein, a downwardly-opening valve between the lower portion of the upper chamber and said passage, and a passage through the upper plunger from the lower portion of the upper chamber to the pump-rod, the latter passage having an upwardly-opening valve.

17. A pump comprising an imperforate well-tube, a partition dividing said well-tube into upper and lower chambers, a tubular pump-rod adapted to reciprocate in said well-tube, plungers connected with said pump-rod and adapted to reciprocate in the upper and lower chambers respectively, a passage through said partition outside of the pump-rod, and valves and passages acting when the said plungers are reciprocated so that each plunger operates to lift a separate body of water on the up-stroke and on the down-stroke thereof.

18. A pump comprising upper and lower chambers, a tubular pump-rod adapted to reciprocate in said chambers, plungers connected with said pump-rod and adapted to reciprocate in said chambers respectively, a tube outside of said pump-rod adapted to conduct water from the lower to the upper chamber, and means co-acting with said plungers to cause the same to lift a body of water on each upward or downward stroke thereof.

19. A pump comprising a well-tube having upper and lower chambers, a tubular pump-rod passing through said chambers, plungers in said chambers secured to said pump-rod, said pump-rod communicating with the well-tube below the lower plunger, a tube outside of said pump-rod connecting said chambers, and valves controlling the flow of water so that each of said plungers is adapted to receive and discharge water on the down-stroke and on the up-stroke thereof.

20. A pump comprising upper and lower chambers, a hollow pump-rod extending through said chambers, a passage connecting said upper and lower chambers and means operated by said pump-rod and acting on the down-stroke thereof to supply liquid to, and discharge liquid from, each chamber through said pump-rod, and acting on the up-stroke of said pump-rod to supply liquid to the upper chamber through said pump-rod, and discharge liquid therefrom through said passage, and to supply liquid to the lower chamber through said passage and discharge liquid from said lower chamber through the pump-rod.

21. A pump comprising an imperforate well-tube, a partition dividing said well-tube into upper and lower chambers, a tubular pump-rod passing through both chambers, plungers in said chambers secured to said pump-rod, and means whereby each plunger receives and discharges liquid on each up and each down-stroke of the pump-rod.

22. A double-acting discharge and double-acting supply well pump, consisting of two pumping units one above the other in axial alinement, each having a plunger, a tubular pump-rod for reciprocating said plungers, said pump-rod forming a conduit through which a part of the liquid pumped is supplied and discharged and a passage around said pump-rod connecting said upper and lower units.

23. A pump comprising upper and lower chambers, a sectional tubular pump-rod adapted to reciprocate therein, a passage connecting the upper and lower chambers, plungers connected with said pump-rod and reciprocating in said chambers, respectively, each of said plungers operating to draw liquid into its chamber and to discharge liquid therefrom at each up and each down-stroke of the pump-rod, part of the supply and discharge passing through said pump-rod and a part through said passage.

24. A deep well pump consisting of two chambers one above the other, plungers in said chambers, a passage connecting said upper and lower chambers, respectively, a tubular pump-rod for operating said plungers, and valves and passages associated with said plungers and pump-rod to constitute two double-acting pumps each of which simultaneously receives and discharges liquid.

LARS W. BODINSON.

Witnesses:
MATTHEW T. CHAPMAN,
R. D. MAHAFFEY.

Copies of this patent may be obtained for five cents each, by addressing the "Commissioner of Patents, Washington, D. C."